(12) United States Patent
Shimokawa et al.

(10) Patent No.: US 7,105,241 B2
(45) Date of Patent: Sep. 12, 2006

(54) MAGNETIC DISK AND METHOD OF MANUFACTURING SAME

(75) Inventors: Koichi Shimokawa, Yamanashi (JP); Masafumi Ishiyama, Singapore (SG)

(73) Assignees: Hoya Corporation, Tokyo (JP); Hoya Magnetics Singapore Pte. Ltd., Singapore (SG)

( * ) Notice: Subject to any disclaimer, the term of this patent is extended or adjusted under 35 U.S.C. 154(b) by 0 days.

(21) Appl. No.: 10/809,352

(22) Filed: Mar. 26, 2004

(65) Prior Publication Data

US 2004/0213951 A1    Oct. 28, 2004

(30) Foreign Application Priority Data

Mar. 31, 2003  (JP) ............................. 2003-096820
Oct. 22, 2003  (JP) ............................. 2003-361982

(51) Int. Cl.
*G11B 5/66* (2006.01)
*G11B 5/70* (2006.01)

(52) U.S. Cl. .................... 428/835.8; 427/130; 427/131

(58) Field of Classification Search ................ 428/421, 428/694 TF, 833.3, 835.2, 835.7, 835.8; 427/130, 427/131

See application file for complete search history.

(56) References Cited

U.S. PATENT DOCUMENTS 5,562,965 A    10/1996   Gui et al.

(Continued)

FOREIGN PATENT DOCUMENTS

EP    1372141    12/2003

(Continued)

OTHER PUBLICATIONS

English language Abstract of JP 62-66417.

(Continued)

*Primary Examiner*—Holly Rickman
(74) *Attorney, Agent, or Firm*—Greenblum & Bernstein, P.L.C.

(57) ABSTRACT

Disclosed is a method of manufacturing magnetic disks, comprising a magnetic layer, a protective layer, and a lubricating layer on a substrate. In the process, a lubricant alpha comprising a compound denoted by chemical formula $$HO-CH_2-CH(OH)-CH_2-O-CH_2-CF_2(-O-C_2F_4)p\text{-}(O-CF2)q\text{-}O-CF_2-CH_2-O-CH_2-CH(OH)-CH_2-OH$$

wherein p and q are natural number,
and a compound denoted by chemical formula $$HO-CH_2-CF_2(-O-C_2F_4)m\text{-}(O-CF_2)n\text{-}O-CF_2-CH_2-OH$$

wherein m and n are natural number,
is fractionated by molecular weight to prepare a lubricant a having a weight average molecular weight (Mw) of from 3,000 to 7,000 and a molecular weight dispersion of less than or equal to 1.2;
a lubricant beta comprising a compound denoted by the chemical formula $$HO-CH_2-CF_2(-O-C_2F_4)m\text{-}(O-CF2)n\text{-}O-CF_2-CH_2-OH$$

wherein m and n are natural number,
is fractionated by molecular weight to prepare a lubricant b having a weight average molecular weight (Mw) of from 2,000 to 5,000 and a molecular weight dispersion of less than or equal to 1.2;
a lubricant c comprising a mixture of lubricants a and b is prepared; and
a film of lubricant c is formed on a protective layer provided on a substrate to form a lubricating layer. A magnetic disk comprising a magnetic layer, a protective layer, and a lubricating layer on a substrate, in which the lubricating layer has been formed on the protective layer is also enclosed.

11 Claims, 1 Drawing Sheet

MAGNETIC DISK 10

5 LUBRICATING LAYER
4 PROTECTIVE LAYER
3 MAGNETIC LAYER
2 BASE LAYER
1 DISK SUBSTRATE

U.S. PATENT DOCUMENTS

| | | | |
|---|---|---|---|
| 6,099,937 A * | 8/2000 | Gui et al. | 428/141 |
| 6,316,062 B1 | 11/2001 | Sakaguchi et al. | |
| 6,403,149 B1 | 6/2002 | Parent et al. | |
| 6,548,140 B1 * | 4/2003 | Gui et al. | 428/65.4 |
| 2003/0100454 A1 | 5/2003 | Osawa et al. | |

FOREIGN PATENT DOCUMENTS

| | | |
|---|---|---|
| JP | 62-66417 | 3/1987 |
| JP | 09-282642 | 10/1997 |
| JP | 10-143838 | 5/1998 |
| JP | 2001-52327 | 2/2001 |
| JP | 2002-25046 | 1/2002 |

OTHER PUBLICATIONS

English language Abstract of JP 09-282642.
English language Abstract of JP 10-143838.
English language Abstract of JP 201-52327.
English language Abstract of JP 2002-25046.

* cited by examiner

MAGNETIC DISK AND METHOD OF MANUFACTURING SAME

TECHNICAL FIELD

The present invention relates to a method of manufacturing magnetic disks to be loaded into magnetic disk devices such as hard disk drives, as well as to magnetic disks.

BACKGROUND TECHNOLOGY

In magnetic disk devices such as hard disk drives (HDDs), a contact start and stop (CSS) system is employed in which a magnetic head is brought into contact with a contact slide area (CSS area) located in the inner-circumferential area of the magnetic disk surface when stopped, and the magnetic head flies upward while sliding in contact with the disk surface in the CSS area and then recording or reproduction is conducted in a disk area surface for recording and reproduction that is located to the outside of the CSS area when activated. When an operation has been completed, the magnetic head is withdrawn from the recording and reproduction area into the CSS area, after which the magnetic head descends while sliding in contact with the disk surface in the CSS area and comes to a stop. In the CSS system, the operations of starting and terminating in which sliding contact occurs are called CSS operations.

In a magnetic disk employing the CSS system, it is necessary to provide both a CSS area and a recording and reproduction area on the disk surface. It is also necessary to provide an uneven topography having a certain surface roughness on the magnetic disk surface so that the magnetic head and magnetic disk do not adhere to each other when in contact.

To reduce the damage caused by the magnetic head sliding in contact with the magnetic disk during CSS operations, a magnetic recording medium in which a coating of a perfluoroalkylpolyether lubricant of the structure $HOCH_2$—$CF_2O$—$(C_2F_4O)_p$—$(CF_2O)_q$—$CH_2OH$ is applied is known, for example, through Japanese Unexamined Patent Publication (KOKAI) Showa No. 62-66417 (Patent Reference 1).

Similarly, magnetic recording media of high CSS durability are known through Japanese Unexamined Patent Publications (KOKAI) Heisei No. 9-282642 (Patent Reference 2) and Heisei No. 10-143838 (Patent Reference 3).

Recently, magnetic disk devices based on the load-unload (LUL) system have been introduced as substitutes for the CSS system. In the LUL system, the magnetic head is withdrawn to an inclined base, called a "ramp", positioned beyond the disk when stopped. When activated, the magnetic disk is caused to rotate, after which the magnetic head slides over the magnetic disk from the ramp to conduct recording and reproduction. This series of operations is referred to as LUL operations. Since a broader recording and reproduction area can be ensured on the magnetic disk surface than in the CSS system, the LUL system is desirable for achieving high information capacity. Further, since the uneven topography employed in the CSS system is not required on the magnetic disk surface, the magnetic disk surface can be made extremely smooth. This permits a significant decrease in the flying height level of the magnetic head, making it possible to achieve high S/N ratios for recording signals.

With the introduction of the LUL system, as the magnetic head flying height level has decreased sharply in discontinuous fashion, the requirement that a magnetic disk stably operate even at an extremely low flying height level of 10 nm or less has emerged. However, when the magnetic head is moved rapidly while flying over the surface of the magnetic disk at an extremely low level, there are problems in that "fly-sticking" impairment and head corrosion impairment frequently occur.

"Fly-sticking" impairment refers to impairment in the form of modulation in the position and flying level of the magnetic head during flying. It is accompanied by irregular reproduction output. In some cases, the magnetic disk contacts the magnetic head during flying, causing the head to crash and damaging the magnetic disk.

"Corrosion" impairment refers to impairment in the form of the corrosion of elements of the magnetic head that creates problems during recording and reproduction, and in some causes, renders recording and reproduction impossible. The corroded elements sometimes expand, damaging the surface of the magnetic disk during flying.

Recently, the rotational speed of the magnetic disk has been increased to enhance the response time of the magnetic disk device. The rotational speed of 2.5-inch magnetic disk devices of small diameter suited to mobile applications was formerly 4,200 rpm, but has recently been increased to 5,400 rpm and above to enhance response characteristics.

When the magnetic disk is rotated at such high speeds, a phenomenon occurs in which the centrifugal force accompanying movement causes the lubricating layer to migrate, resulting in nonuniformity of the thickness of the lubricating layer within the magnetic disk surface.

When the thickness of the lubricating layer is increased on the outer circumference portion of the disk, fly-sticking impairment and head crashing impairment tend to occur when the magnetic head enters from the outer circumferential portion of the disk during an LUL operation. When the thickness of the lubricating layer is reduced on the inner circumferential portion, the reduction in lubricating performance tends to cause head crashing.

The lubricating techniques described in above-cited Patent References 1, 2, and 3 that have been employed thus far were primarily developed with emphasis on improving CSS operations. When they are employed in LUL-system magnetic disks, the frequency of the above-described impairments is high, and it is already difficult to satisfy the reliability that has recently come to be required of magnetic disks. Thus, they have become factors impeding the development of high-capacity, high S/N ratio, rapid-response LUL-system magnetic disks.

Based on such problems, the present invention has for its object to provide a magnetic disk, particularly a load-unload magnetic disk, equipped with a highly adhesive lubricating layer that is capable of preventing migration even at high rotational speeds of 5,400 rpms and above and that is capable of preventing fly-sticking and corrosion impairment even at extremely low flying levels of 10 nm or less, for example.

DISCLOSURE OF THE INVENTION

The present inventors discovered that the above-stated problems were solved by the inventions set forth below; the present invention was devised on that basis.

The present invention relates to:

(1) A method of manufacturing magnetic disks comprising a magnetic layer, a protective layer, and a lubricating layer on a substrate, in which a lubricant alpha comprising a compound denoted by chemical formula

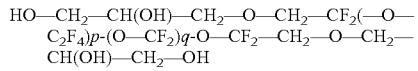 [Chem. 1]

wherein p and q are natural number, and a compound denoted by chemical formula

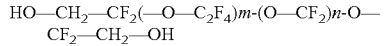 [Chem. 2]

wherein m and n are natural number, is fractionated by molecular weight to prepare a lubricant a having a weight average molecular weight (Mw) of from 3,000 to 7,000 and a molecular weight dispersion of less than or equal to 1.2;

a lubricant beta comprising a compound denoted by the chemical formula

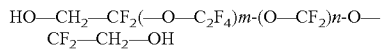 [Chem. 3]

wherein m and n are natural number, is fractionated by molecular weight to prepare a lubricant b having a weight average molecular weight (Mw) of from 2,000 to 5,000 and a molecular weight dispersion of less than or equal to 1.2;

a lubricant c comprising a mixture of lubricants a and b is prepared; and a film of lubricant c is formed on a protective layer provided on a substrate to form a lubricating layer.

(2) The method of manufacturing magnetic disks of (1) above wherein the fractionation by molecular weight is conducted by supercritical extraction.

(3) The method of manufacturing magnetic disks of (1) or (2) above wherein lubricant c is prepared by obtaining a composition A of lubricant a dispersed in a fluorine-base solvent, obtaining a composition B of lubricant b dispersed in a fluorine-base solvent, mixing compositions A and B, and extracting lubricant c from the mixed composition.

(4) The method of manufacturing magnetic disks of any of from (1) to (3) above wherein after forming the lubricating layer, the resultant magnetic disk is exposed to an atmosphere of from 50 to 150° C. to adhere lubricant c to the protective layer.

(5) The method of manufacturing magnetic disks of any of from (1) to (4) above wherein the protective layer is formed by plasma CVD.

(6) The method of manufacturing magnetic disks of any of from (1) to (5) above employed for load-unload system magnetic disk devices.

(7) The method of manufacturing magnetic disks of any of from (1) to (6) above further characterized in that Fomblin Ztetraol (product name) made by Solvay Solexis is selected as lubricant alpha and Fomblin Zdol (product name) made by Solvay Solexis is selected as lubricant beta.

(8) A magnetic disk comprising a magnetic layer, a protective layer, and a lubricating layer on a substrate, in which the lubricating layer has been formed on the protective layer, said lubricating layer being comprised of a lubricant c, comprising a lubricant a having a weight average molecular weight (Mw) of from 3,000 to 7,000 and a molecular weight dispersion of less than or equal to 1.2 obtained by refining a lubricant alpha comprising the compound denoted by the chemical formula

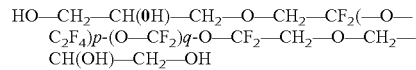 [Chem. 4]

wherein p and q are natural number, and a compound denoted by chemical formula

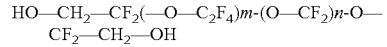 [Chem. 5]

wherein m and n are natural number, and a lubricant b having a weight average molecular weight (Mw) of from 2,000 to 5,000 and a molecular weight dispersion of less than or equal to 1.2, comprising a lubricant beta comprising a compound denoted by chemical formula

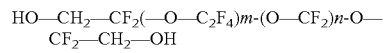 [Chem. 6]

wherein m and n are natural number.

(9) A magnetic disk comprising a magnetic layer, a protective layer, and a lubricating layer on a substrate, in which the lubricating layer has been formed on the protective layer, said lubricating layer comprising a compound denoted by the chemical formula

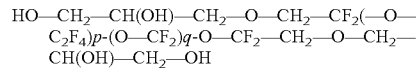 [Chem. 7]

wherein p and q are natural number, and a compound denoted by the chemical formula

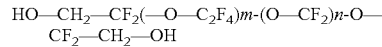 [Chem. 8]

wherein m and n are natural number, and the lubricating layer contains —COOH atomic groups detectable by time of flight secondary ion mass spectrometry.

(10) A magnetic disk comprising a magnetic layer, a protective layer, and a lubricating layer on a substrate, in which the lubricating layer comprises:

a compound denoted by the chemical formula

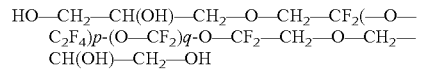 [Chem. 9]

wherein p and q are natural number, a compound denoted by the chemical formula

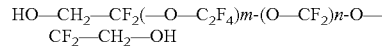 [Chem. 10]

wherein m and n are natural number, and a compound having in its molecular structure —COOH atomic group detectable by time of flight secondary ion mass spectrometry.

(11) The magnetic disk of any of (8) to (10) above, wherein the protective layer is a carbon—base protective layer.

Figure 1:
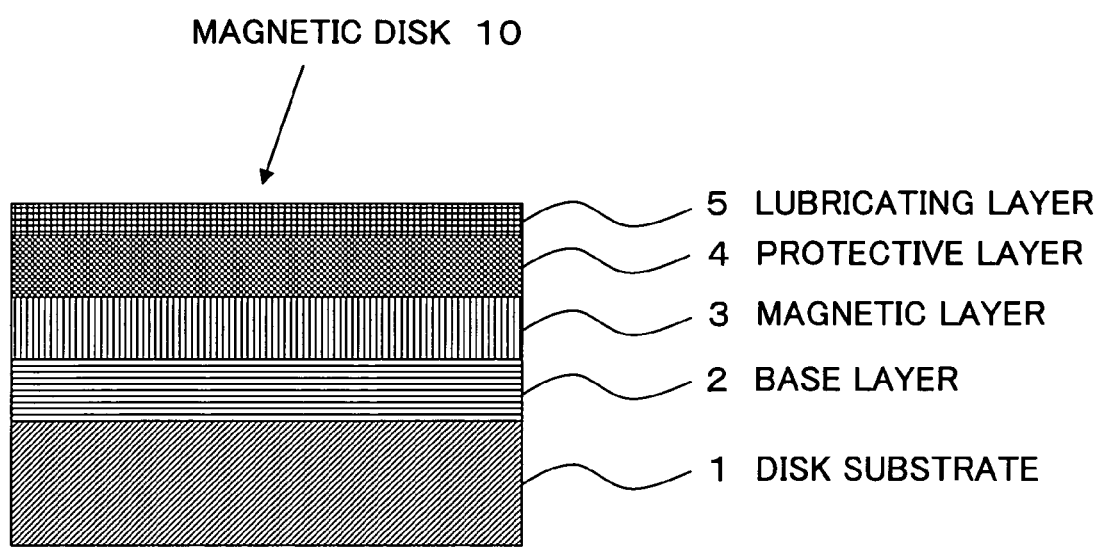
FIG. 1 is a sectional view of a typical embodiment of the magnetic disk of the present invention. In the figure, 10 denotes a magnetic disk, 1 denotes a disk substrate, 2 denotes a base layer, 3 denotes a magnetic layer, 4 denotes a protective layer, and 5 denotes a lubricating layer.

The present inventors studied the above-described impairments of magnetic disks, which have recently become marked, to achieve the above-stated goal, discovering that the following mechanism produces the following results.

They discovered that, when the low flying height level of the magnetic head reaches 10 nm or less, the magnetic head repeatedly causes the lubricating layer on the surface of the magnetic disk to undergo adiabatic compression and adiabatic expansion through air molecules during flying, thereby causing the lubricating layer to tend to repeatedly undergo heating and cooling. They also discovered that this tends to promote breaking down of the lubricant comprising the lubricating layer into lower molecules.

When the lubricant breaks down into lower molecules, fluidity increases and adhesion to the protective layer decreases. The highly fluid lubricant was observed to transfer to and deposit on the magnetic head, positioned nearby, destabilizing the flying position and causing fly-sticking impairment.

In particular, in magnetic heads with NPAB (negative pressure air bearing surface) sliders that have recently been introduced, the lubricant tends to be sucked off by the strong negative pressure generated beneath the magnetic head, which is thought to exacerbate the transfer deposition phenomenon.

The transferred lubricant sometimes produces acids such as hydrofluoric acid, in some cases corroding the element of the magnetic head. Heads containing magnetic resistance-effect elements are particularly prone to corrosion.

The present inventors discovered that the LUL system exacerbates these impairments. In LUL systems, as opposed to CSS systems, the magnetic head does not slide in contact over the magnetic disk surface. Thus, lubricant that has been transferred to and deposited on the magnetic head tends not to transfer to the magnetic disk side. In a conventional CSS system, lubricant that has transferred to the magnetic head tends to be cleaned away by sliding in contact with the CSS area of the magnetic disk, which would explain why such impairments are not marked.

Based on these research results, the present inventors continued their study in light of the above-stated goal. As a result of continuous investigation based on trial and error with numerous lubricants, they devised the present invention.

Fomblin Ztetraol (product name), an alcohol-modified perfluoropolyether-base lubricant made by Solvay Solexis, is thought to contain alcohol-modified perfluoropolyether compounds having various terminal group structures, such as monool compounds, diol compounds, triol compounds, and tetraol compounds. Solvay Solexis clearly states that Fomblin Ztetraol contains the compound denoted by the chemical formula

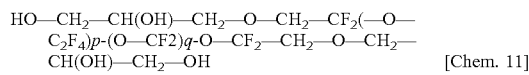 [Chem. 11]

wherein p and q are natural number, (referred to hereinafter as perfluorotetraol compound), but analysis by the present inventors revealed that at least the compound denoted by the chemical formula

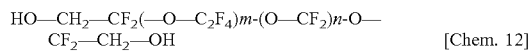 [Chem. 12]

wherein m and n are natural number, (referred to hereinafter as perfluorodiol compound) is also contained.

That is, when the above Fomblin Ztetraol was analyzed by nuclear magnetic resonance (NMR) or time of flight secondary ion mass spectrometry (TOF-SIMS), the above perfluorotetraol compound was found to be the primary compound, but the above perfluorodiol compound was found to be present in a content of from 10 to 30 molar percent as another principal component. Other compounds are also thought to be present as impurities in quantities of about the limit of detection.

Fomblin Zdol (product name) made by Solvay Solexis, also an alcohol-modified perfluoropolyether-base lubricant made by Solvay Solexis, is also clearly stated by Solvay Solexis to contain the above perfluorodiol compound. Upon analysis by the present inventors, this perfluorodiol was found to be the primary component. Other compounds are also thought to be present as impurities in quantities of about the limit of detection.

In alcohol-modified perfluoropolyether-base lubricants, based on the degree of modification by alcohol, that is, based on the difference in the number of hydroxyl groups bonded to the terminal group of the perfluoropolyether main chain, the lubricating properties and adhesive strength of the lubricant molecules vary.

Accordingly, based on the content and generation of various alcohol-modified compounds such as monool compounds, diol compounds, triol compounds, and tetraol compounds, the characteristics of the lubricant vary widely.

In the present invention, a lubricant (referred to as lubricant a) is refined to a specified molecular weight distribution by fractionating by molecular weight a lubricant alpha containing primary components in the form of the above perfluorotetraol compound and perfluorodiol compound. Further, a lubricant (referred to as lubricant b) is refined to a specified molecular weight distribution by fractionating by molecular weight a lubricant beta containing a primary component in the form of the above perfluorodiol compound. A mixed lubricant (referred to as lubricant c) is prepared by mixing lubricants a and b. A film of lubricant c is then coated on the protective layer to solve the above-stated problems.

The content of the perfluorodiol compound in lubricant alpha is desirably from 10 to 30 molar percent.

Although the mechanism by which the above-stated problems are solved in the present invention is not necessarily clear, fractionation is thought to control the state of the alcohol-modified perfluoropolyether compounds contained in lubricants alpha and beta.

When fractionation is conducted so that the molecular weight distribution achieved in lubricant a is a weight average molecular weight (Mw) of 3,000 to 7,000 and so that the molecular weight dispersion when denoted as the weight average molecular weight (Mw)/the number average molecular weight (Mn) is less than or equal to 1.2, the content ratio of the above perfluorodiol compounds, for example, is thought to be increased.

When fractionation is conducted so that the molecular weight distribution achieved in lubricant b is a weight average molecular weight (Mw) of 2,000 to 5,000 and so that the molecular weight dispersion when denoted as the weight average molecular weight (Mw)/the number average molecular weight (Mn) is less than or equal to 1.2, the content ratio of the above perfluorodiol compounds, for example, is thought to be reduced.

Mixing the two fractionated lubricants (to obtain lubricant c) is thought to achieve a content status of the various compounds, that is, a content status (ratio and status of products generated by mixing) of the above perfluorotetraol compounds and perfluorodiol compounds, that is desirable for solving the above stated problems.

An example of a desirable lubricant alpha in the present invention is Fomblin Ztetraol (product name) made by Solvay Solexis. An example of a desirable lubricant beta is Fomblin Zdol (product name) made by Solvay Solexis. In Japan, both are sold by Solvay Solexis Co., Ltd.

The present invention provides a magnetic disk having a magnetic layer, protective layer, and lubricating layer on a substrate. That is, it provides a magnetic disk in which the lubricating layer, a film of a lubricant containing the above perfluorotetraol compound and perfluorodiol compound formed over the protective layer, contains —COOH atomic groups that are detectable by time of flight secondary ion mass spectrometry (TOF-SIMS).

When the present inventors pursued their research still further, they found that the effect of the present invention lay in the relation between the —COOH atomic groups and/or —$CF_2$COOH atomic groups contained in the lubricating layer. That is, when the lubricating layer of the magnetic disk of the embodiments given further below was examined in detail by TOF-SIMS, they discovered that —COOH atomic groups and —$CF_2$COOH atomic groups were present in the lubricating layer. Neither the perfluorotetraol compound nor the perfluorodiol compound contained in the lubricant forming the lubricating layer contained —COOH atomic groups or —$CF_2$COOH atomic groups. Accordingly, the effect of the present invention was found to result from the incorporation of —COOH atomic groups and/or —$CF_2$COOH atomic groups into the lubricating layer that was formed. In the embodiments of the present invention, the use of a carbon-base protective layer and an amorphous carbon protective layer (for example, hydrogenated carbon protective layer) formed by plasma CVD was found to modify part of the lubricating layer that was formed thereover, yielding carboxyl groups. As set forth further below, a carbon-base protective layer, particularly an amorphous carbon-base protective layer, is thought to be related to the high affinity for alcohol-modified perfluoropolyether compounds.

The —COOH atomic groups and —$CF_2$COOH atomic groups contained in the lubricating layer can both be detected by TOF-SIMS. Since —$CF_2$COOH atomic groups can be simultaneously detected when detecting —COOH atomic groups, the count of —$CF_2$COOH atomic groups detected is included in the count of —COOH atomic groups detected.

The present invention provides a magnetic disk having a magnetic layer, protective layer, and lubricating layer on a substrate, with the lubricating layer containing the above perfluorotetraol compounds and perfluorodiol compounds, as well as a compound having within its molecular structure —COOH atomic groups detectable by TOF-SIMS.

Based on the information discovered by the present inventors, the incorporation of —COOH atomic groups and/or —$CF_2$COOH atomic groups into the lubricating layer that is formed is desirable to achieve the effect of the present invention. The incorporation into the lubricating layer of a compound having within its molecular structure —COOH atomic groups detectable by TOF-SIMS is also desirable. In that case, the lubricating layer contains the above perfluorotetraol compounds and perfluorodiol compounds, as well as a compound having within its molecular structure —COOH atomic groups. Examples of compounds having within their molecular structure —COOH atomic groups that are detectable by TOF-SIMS are perfluoropolyether-base compounds in which a terminal of the main chain or a side chain has been modified into a carboxyl group. Such a lubricating layer may be obtained, for example, by forming a film on the protective layer of a lubricant containing the above perfluorotetraol compounds, perfluorodiol compounds, and compound having —COOH atomic groups in its molecular structure.

BEST MODE OF IMPLEMENTING THE INVENTION

In the present invention, when preparing lubricant c, lubricant a and lubricant b are desirably mixed together in a blending proportion by weight of from 1:2 to 2:1. When the blending proportion falls within this range, the alcohol-modified perfluoropolyether compound contained in lubricant c is thought to be in a particularly desirable state for solving the above-stated problems.

In the present invention, the method of fractionation by molecular weight is not specifically limited. For example, molecular weight fractionation by gel permeation chromatography (GPC) and supercritical extraction are both possible. Of these, the use of supercritical extraction for fractionation of lubricants alpha and beta is desirable. The use of fractionation by supercritical extraction permits a high degree of refinement of the lubricant. Specifically, supercritical extraction employing carbon dioxide as eluting solvent is suitable. Molecular weight fractionation by chromatography is preferred. Molecular weight fractionation is also possible based on retention time.

When the pressure of the carbon dioxide is adjusted to 80 to 350 kgf/$cm^2$ and the temperature to from 35 to 300° C., a desirable carbon dioxide supercritical state is achieved. When adjusted to within this range, differences in solubility due to slight differences in molecular weight and the structure of terminal groups can be used for precise separation by terminal group.

When employing chromatography, carbon dioxide in a supercritical state and containing the lubricant is made to flow and the lubricant in the fractions eluting out of the column is monitored. For example, monitoring can be conducted by Fourier transform infrared spectrophotometry (FTIR) and ultraviolet absorption. While monitoring, fractions can be obtained based on retention time to achieve fractionation into a good molecular weight distribution.

When preparing lubricant c, lubricants a and b may be directly mixed, or in order to achieve a uniform mixture state, compositions may be prepared by dispersing the two into separate fluorine-base solvents. The compositions are then desirably mixed and stirred, and the mixture extracted with an evaporator to obtain lubricant c. Extraction in this manner yields a highly uniform mixture state.

Vertrel XF, the name of a product made by Dupont Mitsui Fluorochemicals, is desirably employed as the fluorine-base solvent.

In the present invention, it suffices to expose the magnetic disk to an atmosphere of 50 to 150° C. following film formation to adhere mixed lubricant c to the protective layer. This range is lower than the decomposition temperatures of lubricants a and b, so the breakdown of lubricant c into lower molecules is avoidable.

In the present invention, the thickness of the lubricating layer can be from 5 to 15 Angstroms. At below 5 Angstroms, the lubricating properties of the lubricating layer decrease. At greater than 15 Angstroms, fly sticking impairment sometimes occurs and LUL durability sometimes decreases.

In the present invention, following formation of the lubricating layer, heat treating the magnetic disk by exposing it to an atmosphere within the above-stated temperature range has the effect of promoting the generation of —COOH and/or —CF$_2$COOH atomic groups in the lubricating layer. A carbon-base protective layer, particularly an amorphous carbon-base protective layer, has high affinity for alcohol-modified perfluoropolyether compounds, as set forth further below. Accordingly, forming the lubricating layer of the present invention on a carbon-base protective layer and subjecting it to such a heat treatment permits the suitable generation of —COOH and/or —CF$_2$COOH atomic groups in the lubricating layer.

A carbon-base protective layer may be employed as the protective layer in the present invention. An amorphous carbon protective layer is preferred. Such a protective layer has high affinity for alcohol-modified perfluoropolyether compounds and yields suitable adhesion strength. The adhesion strength may be regulated by employing a carbon protective layer of hydrogenated carbon or nitrogenated carbon and adjusting the content of hydrogen and/or nitrogen.

When the hydrogen content (hydrogen content in a protective layer) is measured by hydrogen forward scattering (HFS), a level of 3 to 20 at % is desirable. When the nitrogen content (ratio of nitrogen to carbon, N/C) is measured by X-ray photoelectric spectroscopic analysis (XPS), a level of 4 to 12 at % is desirable.

When employing a carbon-base protective layer in the present invention, an amorphous carbon-base protective layer formed by plasma CVD is desirable. An amorphous hydrogenated carbon protective layer formed by CVD is particularly desirable. When forming a carbon-base protective layer by plasma CVD, it suffices to employ low unsaturation hydrogen carbide, specifically, a straight-chain low unsaturation hydrogen carbide gas with 10 or fewer carbon atoms, such as acetylene.

The present invention is described in greater detail below through embodiments.

(Embodiment 1)

FIG. 1 shows a magnetic disk 10 in an implementation mode of the present invention.

In magnetic disk 10, on a disk substrate 1 are sequentially formed a base layer 2, magnetic layer 3, protective layer 4, and lubricating layer 5. Lubricating layer 5 is formed out of the lubricant (referred to as lubricant c) of the present invention. This will be described more specifically below.

(Preparation of the Lubricant)

The method of preparing the lubricant will be described.

First, Fomblin Ztetraol (product name) made by Solvay Solexis (referred to as lubricant alpha below) was selected and procured as the lubricant containing the above perfluorotetraol compound and perfluorodiol compound. A pressure column was mounted on a supercritical fluid application device configured of a supercritical fluid delivery device, temperature regulating device, pressure regulating device, FTIR, and ultraviolet-visible spectrum detector. Carbon dioxide was employed as the mobile phase in molecular weight fractionation to fractionate the lubricant by molecular weight based on supercritical extraction. The lubricant obtained by fractionation was referred to as lubricant a.

Next, Fomblin Zdol (product name) made by Solvay Solexis (referred to as lubricant beta below) was selected and procured as the lubricant containing the above perfluorodiol compound. Similarly, molecular weight fractionation of the lubricant by supercritical extraction was conducted. The lubricant obtained by fractionation was referred to as lubricant b. The details of the supercritical extraction method are given below.

When the molecular weight distributions of lubricants a and b that had been obtained were measured using polymethyl methacrylates of varying molecular weight as reference substances by gel permeation chromatography (GPC), the molecular weight distribution of lubricant a was found to be a weight average molecular weight (Mw) of from 3,000 to 7,000 with a molecular weight dispersion of from 1.05 to 1.2. The molecular weight distribution of lubricant b was found to be a weight average molecular weight (Mw) of from 2,000 to 5,000 with a molecular weight dispersion of from 1.05 to 1.2. The molecular weight dispersion indicates the ratio of the weight average molecular weight (Mw)/number average molecular weight (Mn).

A composition (referred to as composition A) was prepared by dispersing lubricant a that had been fractionated in this manner in Vertrel XF (product name), a fluorine-base solvent made by Dupont Mitsui Fluorochemicals.

Similarly, a composition (referred to as composition B) was prepared by separately dispersing lubricant b that had been fractionated in this manner in Vertrel XF (product name) made by Dupont Mitsui Fluorochemicals Compositions A and B were mixed and intimately stirred to prepare a mixed composition. Mixing was conducted in such a manner that the blending proportion of lubricants a and b was 1:1 by weight.

The Vertrel XF (product name), made by Dupont Mitsui Fluorochemicals, was removed from the mixed composition with an evaporator, and a lubricant was extracted (referred to as lubricant c below).

Preparing the above lubricant in a clean room kept the purity of lubricant c high. The cleanliness class of the atmosphere of the clean room that was employed exceeded cleanliness class 6 specified by Japan Industrial Standard (JIS) B9920 or ISO (14644-1), or exceeded cleanliness class 1000 (Federal Standard: FED-STD-209D).

(Manufacturing of a Magnetic Disk)

A 2.5-inch chemically reinforced glass disk (outer diameter 65 mm, inner diameter 20 mm, disk thickness 0.635 mm) made of alumina silicate glass was procured for use as disk substrate 1.

On this disk substrate were sequentially formed by DC magnetron sputtering a base layer 2 and a magnetic layer 3.

Base layer 2 was prepared by forming over a first base layer comprised of a thin AlRu alloy film a second base layer comprised of a thin CrW alloy film. Magnetic layer 3 was a thin CoCrPtB alloy film.

Next, plasma CVD was employed to form a protective layer 4 (60 Angstroms in thickness) comprised of amorphous diamond-like carbon. When forming the film, low straight-chain hydrogen carbide gas was employed.

When protective layer 4 was analyzed by HFS, it was found to contain 15 at % of hydrogen.

Next, previously prepared lubricant c was coated by dipping to form lubricating layer 5.

After film formation, magnetic disk 10 was heated in an oven to 100° C. to adhere lubricant c to protective layer 4. Heating was conducted for one hour. Measurement by FTIR revealed lubricating layer 5 to be 10 Angstroms in thickness.

(Evaluation of the Magnetic Disk)

An LUL durability test was conducted to determine the LUL (load-unload) durability of the magnetic disk 10 obtained.

An LUL-system hard disk drive (HDD) (rotating at 5,400 rpm) was procured and magnetic disk 10 was loaded with a magnetic head having a flying height level of 10 nm. The magnetic head had an NPAB slider on which was mounted a reproduction element in the form of a magnetoresistive element (GMR element). The shield element was made of FeNi-base permalloy. LUL operations were repeatedly conducted with this LUL-system HDD and the number of LUL operations that magnetic disk 10 lasted before failure occurred was counted.

As a result, it was found that magnetic disk 10 of the present embodiment lasted 800,000 LUL operations without failing. It is said that about 10 years of use is required to exceed 400,000 LUL operations under a normal HDD use environment. Thus, magnetic disk 10 of the present invention was highly reliable.

No fly-sticking impairment occurred with any of the HDDs that were tested.

Detailed examinations of the surface of the magnetic head following LUL durability testing were conducted by optical microscope and electron microscope. However, no scoring or corrosion was found. Nor was any transfer of lubricant to the magnetic head observed.

(Embodiments 2 and 3)

In Embodiment 2, the blending proportion of compositions A and B was varied to achieve a weight ratio of 1:2 of lubricant a to lubricant b.

In Embodiment 3, the mixing ratio of compositions A and B was varied to achieve a blending proportion by weight of 2:1 of lubricant a to lubricant b. These exceptions aside, these embodiments were identical to Embodiment 1.

When LUL durability testing was conducted in the same manner as in Embodiment 1, both Embodiments 2 and 3 achieved the same good results as Embodiment 1.

A detailed analysis of the lubricating layers of the magnetic disks of each of Embodiments 1 through 3 by TOF-SIMS revealed that the magnetic disks of all of the embodiments contained —COOH atomic groups and —CF$_2$COOH atomic groups in the lubricating layer. These atomic groups were not contained in either the above perfluorotetraol compound or the above perfluorodiol compound; nor were they contained in lubricant alpha, lubricant beta, lubricant a, lubricant b, or lubricant c. Accordingly, they were thought to be atomic groups that had been generated in the lubricating layer after the formation of the film of lubricant c on the protective layer.

Further, FTIR analysis of the lubricating layer revealed the presence of an absorption band at 1730±10 cm$^{-1}$ in the infrared absorption spectrum.

A magnetic disk was prepared by forming by the same method as in Embodiment 1 a lubricating layer 5 over a hydrogenated carbon protective layer formed by sputtering, but without heat treatment following the formation of lubricating layer 5. Analysis of the lubricating layer by TOF-SIMS revealed a quantity of —COOH atomic groups and —CF$_2$COOH atoms groups that was at about the limit of detection by TOF-SIMS. When this magnetic disk was subjected to LUL durability testing, the number of LUL operations exceeded 400,000 and no fly-sticking impairment was found. However, some transfer of lubricant to the magnetic head was observed. Thus, the magnetic disk of Embodiment 1, in which —COOH atomic groups and/or —CF$_2$COOH atomic groups were generated in the lubricating layer, was determined to be more reliable.

COMPARATIVE EXAMPLES 1 AND 2

In Comparative Example 1, lubricant alpha was applied over protective layer 4 without fractionation. In Comparative Example 2, lubricant beta was applied over protective layer 4 without fractionation.

When LUL durability testing was conducted in the same manner as in Embodiment 1, Comparative Example 1 failed at 400,000 LUL operations. Further, fly-sticking impairment occurred in 50 percent of the HDDs tested. Comparative Example 2 failed at 200,000 LUL operations. Further, fly-sticking impairment occurred in 90 percent of the HDDs tested.

When the magnetic heads of the HDDs of Comparative Examples 1 and 2 were removed and examined after testing, transfer of lubricant to the ABS surface and NPAB pocket portion of the magnetic heads was observed.

COMPARATIVE EXAMPLE 3

In Comparative Example 3, lubricants alpha and beta were mixed in a weight ratio of 1:1 to prepare the lubricant that was coated on the protective layer.

When LUL durability testing was conducted in the same manner as in Embodiment 1, Comparative Example 3 failed at 400,000 LUL operations. Further, fly-sticking impairment was generated in 70 percent of the HDDS employed in the testing. When the magnetic head of the HDD was removed and examined after testing, transfer of lubricant to the ABS surface and NPAB pocket portion of the magnetic head was observed.

When the lubricating layer of the magnetic disk of Comparative Example 2 was analyzed in detail by TOF-SIMS, absolutely no —COOH atomic groups or —CF$_2$COOH atomic groups were detected in the lubricating layer. Thus, the magnetic disk of the embodiments in which —COOH and/or —CF$_2$COOH atomic groups were generated in the lubricating layer were determined to be more reliable.

In the present invention, a lubricant alpha (for example, Fomblin Ztetraol, the name of a product made by Solvay Solexis) is fractionated by molecular weight to obtain a lubricant a with a weight average molecular weight (Mw) of from 3,000 to 7,000 and a molecular weight dispersion of less than or equal to 1.2; a lubricant beta (for example, Fomblin Zdol, the name of a product made by Solvay Solexis) is fractionated by molecular weight to obtained a lubricant b with a weight average molecular weight (Mw) of from 2,000 to 5,000 and a molecular weight dispersion of less than or equal to 1.2; and lubricants a and b are mixed to obtain a lubricant c which is employed to form a lubricating layer. Thus, the present invention provides a magnetic disk in which fly-sticking impairment and corrosion impairment are prevented that is particularly suited to use in LUL-system magnetic disk devices.

Further, the incorporation of —COOH atomic groups detectable by TOF-SIMS into the lubricating layer yields an extremely reliable magnetic disk particularly suited to LUL durability.

The present disclosure relates to subject matter contained in Japanese Patent Application Nos. 2003-96820, filed on Mar. 31, 2003, and 2003-361982, filed on Oct. 22, 2003, the contents of both are herein expressly incorporated by reference in their entireties.

What is claimed is:

1. A method of manufacturing magnetic disks comprising a magnetic layer, a carbon-base protective layer, and a lubricating layer on a substrate, said lubricating layer including —COOH and/or —CF$_2$COOH atomic groups, said method comprising preparing lubricant c by mixing lubricant a and lubricant b;

wherein lubricant a is prepared from a lubricant alpha comprising a compound denoted by chemical formula HO—CH$_2$—CH(OH)—CH$_2$—O—CH$_2$—CF$_2$(—O—C$_2$F$_4$)$p$-(O—CF$_2$)$q$-O—CF$_2$—CH$_2$—O—CH$_2$—CH(OH)—CH$_2$—OH     [Chem. 1]

wherein p and q are natural number,
and a compound denoted by chemical formula

HO—CH$_2$—CF$_2$(—O—C$_2$F$_4$)$m$-(O—CF$_2$)$n$-O—CF$_2$—CH$_2$—OH     [Chem. 2]

wherein m and n are natural number,
are fractionated by molecular weight to prepare the lubricant a having a weight average molecular weight (Mw) of from 3,000 to 7,000 and a molecular weight dispersion of less than or equal to 1.2;

a lubricant beta prepared from a compound denoted by the chemical formula

HO—CH$_2$—CF$_2$(—O—C$_2$F$_4$)$m$-(O—CF$_2$)$n$-O—CF$_2$—CH$_2$—OH     [Chem. 3]

wherein m and n are natural number,
fractionated by molecular weight to prepare the lubricant b having a weight average molecular weight (Mw) of from 2,000 to 5,000 and a molecular weight dispersion of less than or equal to 1.2;
and a film of lubricant c is formed on the carbon—base protective layer to form the lubricating layer.

2. The method of manufacturing magnetic disks of claim 1, wherein the fractionation by molecular weight is conducted by supercritical extraction.

3. The method of manufacturing magnetic disks of claim 1, wherein lubricant c is prepared by obtaining a composition A of lubricant a dispersed in a fluorine-base solvent, obtaining a composition B of lubricant b dispersed in a fluorine-base solvent, mixing compositions A and B, and extracting lubricant c from the mixed composition.

4. The method of manufacturing magnetic disks of claim 1, wherein after forming the lubricating layer, the resultant magnetic disk is exposed to an atmosphere of from 50 to 150° C. to adhere lubricant c to the carbon-base protective layer.

5. The method of manufacturing magnetic disks of claim 1, wherein the carbon-base protective layer is formed by plasma CVD.

6. A load-unload system magnetic disk device comprising a magnetic disk manufactured by the process of claim 1.

7. A magnetic disk comprising a magnetic layer, a carbon-base protective layer, and a lubricating layer on a substrate, said lubricating layer including —COOH and/or —CF$_2$COOH atomic groups, in which the lubricating layer has been formed on the carbon-base protective layer, said lubricating layer being comprised of a lubricant c,
said lubricant c comprising:

a lubricant a having a weight average molecular weight (Mw) of from 3,000 to 7,000 and a molecular weight dispersion of less than or equal to 1.2 obtained by refining a lubricant alpha comprising the compound denoted by the chemical formula HO—CH$_2$—CH(OH)—CH$_2$—O—CH$_2$—CF$_2$(—O—C$_2$F$_4$)$p$-(O—CF$_2$)$q$-O—CF$_2$—CH$_2$—O—CH$_2$—CH(OH)—CH$_2$—OH     [Chem. 4]

wherein p and q are natural number,
and a compound denoted by chemical formula

HO—CH$_2$—CF$_2$(—O—C$_2$F$_4$)$m$-(O—CF$_2$)$n$-O—CF$_2$—CH$_2$—OH     [Chem. 5]

wherein m and n are natural number,
and a lubricant b having a weight average molecular weight (Mw) of from 2,000 to 5,000 and a molecular weight dispersion of less than or equal to 1.2, comprising a lubricant beta comprising a compound denoted by chemical formula HO—CH$_2$—CF$_2$(—O—C$_2$F$_4$)$m$-(O—CF$_2$)$n$-O—CF$_2$—CH$_2$—OH     [Chem. 6]

wherein m and n are natural number.

8. A magnetic disk comprising a magnetic layer, a carbon-base protective layer, and a lubricating layer on a substrate, in which the lubricating layer has been formed on the carbon-base protective layer, said lubricating layer comprising a compound denoted by the chemical formula HO—CH$_2$—CH(OH)—CH$_2$—O—CH$_2$—CF$_2$(—O—C$_2$F$_4$)$p$-(O—CF$_2$)$q$-O—CF$_2$—CH$_2$—O—CH$_2$—CH(OH)—CH$_2$—OH     [Chem. 7]

wherein p and q are natural number,
and a compound denoted by the chemical formula HO—CH$_2$—CF$_2$(—O—C$_2$F$_4$)$m$-(O—CF$_2$)$n$-O—CF$_2$—CH$_2$—OH     [Chem. 8]

wherein m and n are natural number,
and the lubricating layer contains —COOH atomic groups detectable by time of flight secondary ion mass spectrometry.

9. A magnetic disk comprising a magnetic layer, a carbon-base protective layer, and a lubricating layer on a substrate, in which the lubricating layer comprises:
a compound denoted by the chemical formula HO—CH$_2$—CH(OH)—CH$_2$—O—CH$_2$—CF$_2$(—O—C$_2$F$_4$)$p$-(O—CF$_2$)$q$-O—CF$_2$—CH$_2$—O—CH$_2$—CH(OH)—CH$_2$—OH     [Chem. 9]

wherein p and q are natural number,
a compound denoted by the chemical formula

HO—CH$_2$—CF$_2$(—O—C$_2$F$_4$)$m$-(O—CF$_2$)$n$-O—CF$_2$—CH$_2$—OH     [Chem. 10]

wherein m and n are natural number,
and a compound having in its molecular structure —COOH atomic group detectable by time of flight secondary ion mass spectrometry.

10. The magnetic disk of claim 8, wherein the lubricating layer includes —CF$_2$COOH atomic groups.

11. The magnetic disk of claim 9, wherein the lubricating layer includes —CF$_2$COOH atomic groups.

* * * * *